J. S. Waterman.
Corpse Cooler.
No. 76,568.    Patented Apr. 7, 1868.
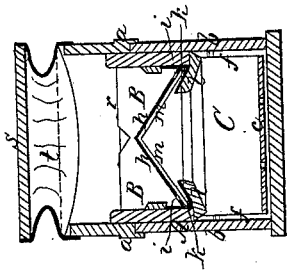
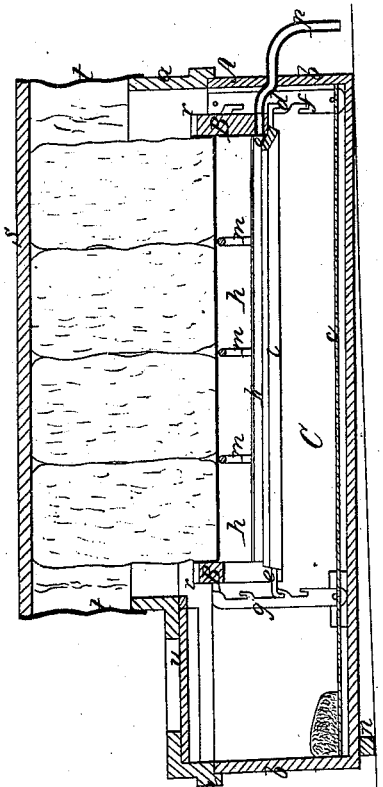
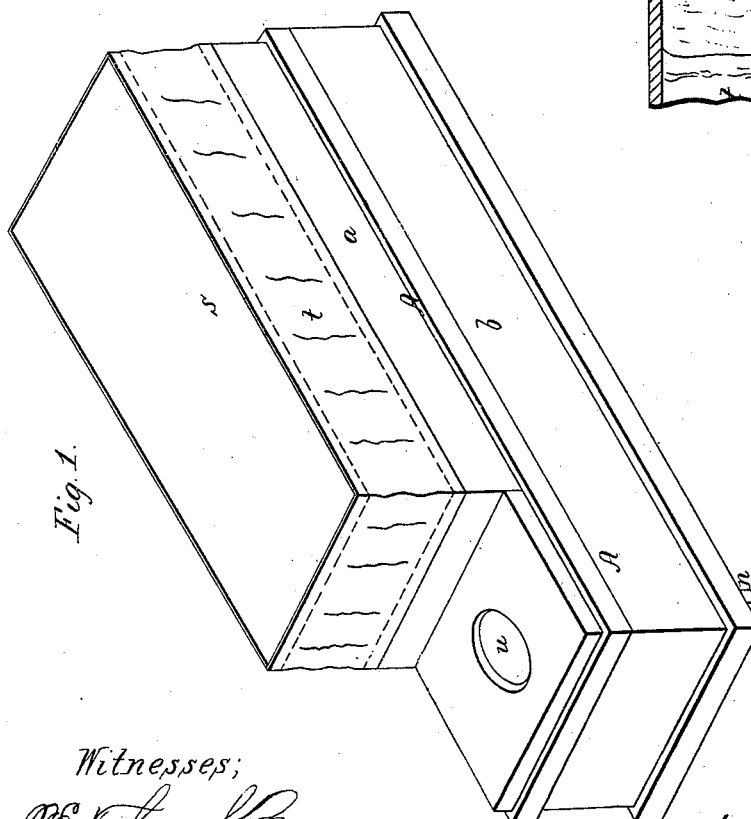
Witnesses:
Inventor:
Joseph S. Waterman

United States Patent Office.

JOSEPH S. WATERMAN, OF ROXBURY, MASSACHUSETTS.

Letters Patent No. 76,568, dated April 7, 1868.

IMPROVEMENT IN CORPSE-PRESERVING CASES.

The Schedule referred to in these Letters Patent and making part of the same.

TO ALL WHOM IT MAY CONCERN:

Be it known that I, JOSEPH S. WATERMAN, of Roxbury, in the county of Norfolk, and State of Massachusetts, have invented certain Improvements in Corpse-Preserving Cases, of which the following is a full, clear, and exact description, reference being had to the accompanying drawings, making part of this specification, in which—

Figure 1 is a perspective view of my improved corpse-preserving case.

Figure 2 is a longitudinal vertical section, through the centre of the same, the ice-chamber being filled with ice.

Figure 3 is a transverse vertical section through the same.

My present invention relates to certain improvements in corpse-preserving cases, for which Letters Patent of the United States were granted to me on the 23d day of April, A. D. 1867; and consists in making the ice-box or chamber adjustable within the case, so that it can be raised or lowered for the purpose of increasing or diminishing the size of the corpse-chamber, and thus insuring the bottom of the ice-box being always in close proximity to the corpse, whether it be of large or small size, so as to cool it rapidly as required.

And my invention also consists in the peculiar form of the metallic bottom of the ice-box, in combination with suitable gutters or conductors, by which construction not only the water from the ice as it melts is carried off, but also the moisture which may be condensed on the under side of the metallic bottom, thus preventing it from dropping upon the corpse; and my invention furthermore consists in covering the bottoms of the metallic conductors with wood or other suitable material, so as to prevent the moisture from collecting thereon.

To enable others skilled in the art to understand and use my invention, I will proceed to describe the manner in which I have carried it out.

In the drawings, A is the corpse-preserving case, which is composed of two sections $a$ $b$, fitted snugly together, and so made that they can be taken apart when it is desired to open the case. B is the ice-box or chamber, beneath which is the corpse-chamber C, at the bottom of which is a perforated rack, $c$, which serves to raise the corpse slightly, and permit the air to circulate freely around it. The ice-box B is provided at one end with two hooks $d$, and at the opposite end with hooks $e$; the former fitting into notched bars $f$, secured permanently to the sides of the case, and the latter into similar bars $g$, which are pivoted at their lower ends, so that they may be swung back when it is desired to remove the ice-box. The bars $f$ $g$ being provided with a series of notches for the reception of the hooks $d$ $e$, it will be seen that the ice-box may be readily secured at the desired height, so as to bring its metallic bottom $h$ in close proximity to the corpse, whether it be of large or small size, and thus cool it rapidly as required.

Any other suitable device, instead of the hooks $d$ $e$ and notched bars $f$ $g$, may be used for supporting the ice-box B, if preferred.

The bottom, $h$, of the ice-box is composed of zinc or other suitable metal, and is inclined down from the centre on each side, as seen in fig. 3, the water from the ice, as it melts, running down through openings $i$, into gutters or conductors $k$ beneath; the conductors being so placed as to also catch any moisture which may be condensed upon and run down the under side of the inclined bottom $h$. The corpse is thus prevented from becoming wet by moisture dropping upon it from the bottom of the ice-box; and to still further guard against this, the conductors $k$ are provided with a casing of wood, $l$, which prevents the moisture from collecting thereon. $m$ are bent ribs, which serve to support the bottom, $h$, and prevent it from being injured by the weight of the ice upon it.

$n$ is a wooden strip placed under the front end of the lower section $b$, so as to give the case a slight inclination, and thus cause the water to pass from the conductors $k$ to a short transverse conductor, $o$, also provided with a casing of wood, from which it is drawn off through a pipe, $p$. This pipe $p$ is represented as passing through the side of the case A, but it may be made to pass through the bottom if preferred.

The ends of the ice-box are made of a less height than the sides, so as to leave spaces $r$ for the passage of the cold air to the corpse-chamber below. The upper section $a$ of the case A is provided with a lid or cover, $s$, which is connected with the sides of the section by means of rubber or other flexible material $t$, in order that the capacity of the ice-box or chamber may be increased or diminished to conform to the size of the ice within it. This device, however, and also the spaces *r*, above described, form the subject of my aforesaid Letters Patent of April 23, 1867, and will not, therefore, be further described. *u* is a pane of glass set in an aperture in the upper section of the case, through which the corpse may be viewed.

*Claim.*

What I claim as my invention, and desire to secure by Letters Patent, is—

Making the ice-box B adjustable within the case A, so that it can be raised or lowered to increase or diminish the size of the corpse-chamber, for the purposes described.

I also claim covering the conductors *k o* with wood or its equivalent, for the purpose herein set forth.

JOSEPH S. WATERMAN.

Witnesses:
  P. E. TESCHEMACHER,
  W. J. CAMBRIDGE.